United States Patent
Kulandai Samy et al.

(10) Patent No.: US 12,147,501 B2
(45) Date of Patent: *Nov. 19, 2024

(54) OBJECT DETECTION SYSTEMS AND METHODS INCLUDING AN OBJECT DETECTION MODEL USING A TAILORED TRAINING DATASET

(71) Applicant: Tyco Fire & Security GmbH, Neuhausen am Rheinfall (CH)

(72) Inventors: Santle Camilus Kulandai Samy, Santa Clara, CA (US); Rajkiran Kumar Gottumukkal, Bangalore (IN); Yohai Falik, Petah Tiqwa (IL); Rajiv Ramanasankaran, Santa Clara, CA (US); Prantik Sen, Bangalore (IL); Deepak Chembakassery Rajendran, Kerala (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,921

(22) Filed: Dec. 8, 2023

(65) Prior Publication Data
US 2024/0111835 A1   Apr. 4, 2024

Related U.S. Application Data

(63) Continuation of application No. 17/468,175, filed on Sep. 7, 2021, now Pat. No. 11,893,084.

(51) Int. Cl.
*G06K 9/00*   (2022.01)
*G06F 18/214*   (2023.01)
(Continued)

(52) U.S. Cl.
CPC .......... *G06F 18/2148* (2023.01); *G06T 7/246* (2017.01); *G06V 10/25* (2022.01);
(Continued)

(58) Field of Classification Search
None
See application file for complete search history.

(56) References Cited

U.S. PATENT DOCUMENTS 9,858,677 B2 *   1/2018   Romanenko ............ G06T 7/248
11,409,989 B2 *   8/2022   Taheri .................... G06V 10/82
(Continued)

FOREIGN PATENT DOCUMENTS

WO   WO-2019005291 A1 *   1/2019   .......... G06K 9/4604

*Primary Examiner* — Feng Niu
(74) *Attorney, Agent, or Firm* — ArentFox Schiff LLP

(57) ABSTRACT

Disclosed herein is an object detection system, including apparatuses and methods for object detection. An implementation may include receiving a first image frame from an ROI detection model that generated a first ROI boundary around a first object detected in the first image frame and subsequently receiving a second image frame. The implementation further includes predicting, using an ROI tracking model, that the first ROI boundary will be present in the second image frame and then detecting whether the first ROI boundary is in fact present in the second image frame. The implementation includes determining that the second image frame should be added to a training dataset for the ROI detection model when detecting that the ROI detection model did not generate the first ROI boundary in the second image frame as predicted and re-training the ROI detection model using the training dataset.

20 Claims, 6 Drawing Sheets

(51) Int. Cl.
  *G06T 7/246*    (2017.01)
  *G06V 10/25*    (2022.01)
  *G06V 10/62*    (2022.01)
  *G06V 10/774*   (2022.01)
  *G06V 20/40*    (2022.01)

(52) U.S. Cl.
  CPC ............ *G06V 10/62* (2022.01); *G06V 10/774* (2022.01); *G06V 20/41* (2022.01); *G06T 2207/20081* (2013.01); *G06T 2207/20084* (2013.01); *G06T 2207/20132* (2013.01); *G06T 2207/30168* (2013.01); *G06T 2207/30196* (2013.01); *G06T 2207/30232* (2013.01)

(56) References Cited

U.S. PATENT DOCUMENTS

| | | | |
|---|---|---|---|
| 2016/0070988 A1* | 3/2016 | Romanenko | G06T 7/248 |
| | | | 382/159 |
| 2019/0391578 A1* | 12/2019 | Tariq | G06N 7/01 |
| 2021/0117724 A1* | 4/2021 | Taheri | G06V 30/274 |

* cited by examiner

OBJECT DETECTION SYSTEMS AND METHODS INCLUDING AN OBJECT DETECTION MODEL USING A TAILORED TRAINING DATASET

CROSS-REFERENCE TO RELATED APPLICATIONS

This application is a continuation of U.S. Non-Provisional application Ser. No. 17/468,175, filed Sep. 7, 2021, which is herein incorporated by reference.

TECHNICAL FIELD

The described aspects relate to object detection systems.

BACKGROUND

Aspects of the present disclosure relate generally to object detection systems, and more particularly, to an object detection system including an object detection model that uses a tailored training dataset.

Some surveillance and retail analytics use-cases use models for the detection of a region of interest (ROI) that bounds one or more objects, such as persons, vehicles, or any other object configured to be detected, in live camera videos. These detection models are required to be highly accurate to avoid vulnerable misses and false alarms associated with missed or improper detection of an object. A good ROI detection method may produce low accuracy models if the training data is not good enough. It is necessary in these types of applications to re-train pre-trained models using on-premise or equivalent data for improving model accuracy. For this purpose, proper data selection for model training is always a challenge. One approach may involve routing on-premise raw videos to generate large amounts of training data, and using all the generated data. However, doing so may be detrimental because redundant data may increase the tendency of the detection model to produce false positives and false negatives.

Conventional object detection systems are unable to resolve these issues. Accordingly, there exists a need for improvements in such systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for object detection, comprising receiving a first image frame from an ROI detection model that is configured to detect an object in an image and generate an ROI boundary around the object, wherein the first image frame comprises a first ROI boundary around a first object. The method further includes receiving, from the ROI detection model, a second image frame that is a subsequent frame to the first image frame in a video. The method further includes predicting, using an ROI tracking model, that the first ROI boundary will be present in the second image frame in response to detecting the first object in the second image frame, wherein the ROI tracking model is configured to identify objects in an image that are bounded by ROI boundaries and detect whether the objects exist in another image. The method further includes detecting whether the first ROI boundary is present in the second image frame. The method further includes determining that the second image frame should be added to a training dataset for the ROI detection model in response to detecting that the ROI detection model did not generate the first ROI boundary in the second image frame as predicted. The method further includes re-training the ROI detection model, to define a re-trained ROI detection model, using the training dataset comprising the second image frame.

Another example implementation includes an apparatus for object detection, comprising a memory and a processor communicatively coupled with the memory. The processor is configured to receive a first image frame from an ROI detection model that is configured to detect an object in an image and generate an ROI boundary around the object, wherein the first image frame comprises a first ROI boundary around a first object. The processor is configured to receive, from the ROI detection model, a second image frame that is a subsequent frame to the first image frame in a video. The processor is configured to predict, using an ROI tracking model, that the first ROI boundary will be present in the second image frame in response to detecting the first object in the second image frame, wherein the ROI tracking model is configured to identify objects in an image that are bounded by ROI boundaries and detect whether the objects exist in another image. The processor is configured to detect whether the first ROI boundary is present in the second image frame. The processor is configured to determine that the second image frame should be added to a training dataset for the ROI detection model in response to detecting that the ROI detection model did not generate the first ROI boundary in the second image frame as predicted. The processor is configured to re-train the ROI detection model, to define a re-trained ROI detection model, using the training dataset comprising the second image frame.

Another example implementation includes an apparatus for object detection, comprising means for receiving a first image frame from an ROI detection model that is configured to detect an object in an image and generate an ROI boundary around the object, wherein the first image frame comprises a first ROI boundary around a first object. The apparatus further includes means for receiving, from the ROI detection model, a second image frame that is a subsequent frame to the first image frame in a video. The apparatus further includes means for predicting, using an ROI tracking model, that the first ROI boundary will be present in the second image frame in response to detecting the first object in the second image frame, wherein the ROI tracking model is configured to identify objects in an image that are bounded by ROI boundaries and detect whether the objects exist in another image. The apparatus further includes means for detecting whether the first ROI boundary is present in the second image frame. The apparatus further includes means for determining that the second image frame should be added to a training dataset for the ROI detection model in response to detecting that the ROI detection model did not generate the first ROI boundary in the second image frame as predicted. The apparatus further includes means for re-training the ROI detection model, to define a re-trained ROI detection model, using the training dataset comprising the second image frame.

Another example implementation includes a computer-readable medium for object detection, executable by a processor to receive a first image frame from an ROI detection model that is configured to detect an object in an image and generate an ROI boundary around the object, wherein the first image frame comprises a first ROI boundary around a first object. The instructions are further executable to receive, from the ROI detection model, a second image frame that is a subsequent frame to the first image frame in a video. The instructions are further executable to predict, using an ROI tracking model, that the first ROI boundary will be present in the second image frame in response to detecting the first object in the second image frame, wherein the ROI tracking model is configured to identify objects in an image that are bounded by ROI boundaries and detect whether the objects exist in another image. The instructions are further executable to detect whether the first ROI boundary is present in the second image frame. The instructions are further executable to determine that the second image frame should be added to a training dataset for the ROI detection model in response to detecting that the ROI detection model did not generate the first ROI boundary in the second image frame as predicted. The instructions are further executable to re-train the ROI detection model, to define a re-trained ROI detection model, using the training dataset comprising the second image frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Production grade region of interest (ROI) detection models require not only a good grade state-of-the-art training method, but a large volume of good quality data as well. Sample ROI detection methods can be YoloV3, YoloV5 or EfficientDet models. The present disclosure describes an analytic pipeline to identify data that such pre-trained models perform poorly on and generate a training dataset based on the identified data to address the poor performance. For example, the systems and methods described may receive thousands of on-premises videos, select suitable image data from the videos (e.g., images where objects were not detected when they were supposed to be), and re-train an ROI detection model continuously. A hybrid approach for selecting data through ROI detection, ROI tracking, and motion modeling is used. More specifically, the systems and methods of the present disclosure select images for training are those on which the current model fails to detect a ROI (i.e., a false negative) or makes a false ROI detection (i.e., a false positive).

Figure 1:
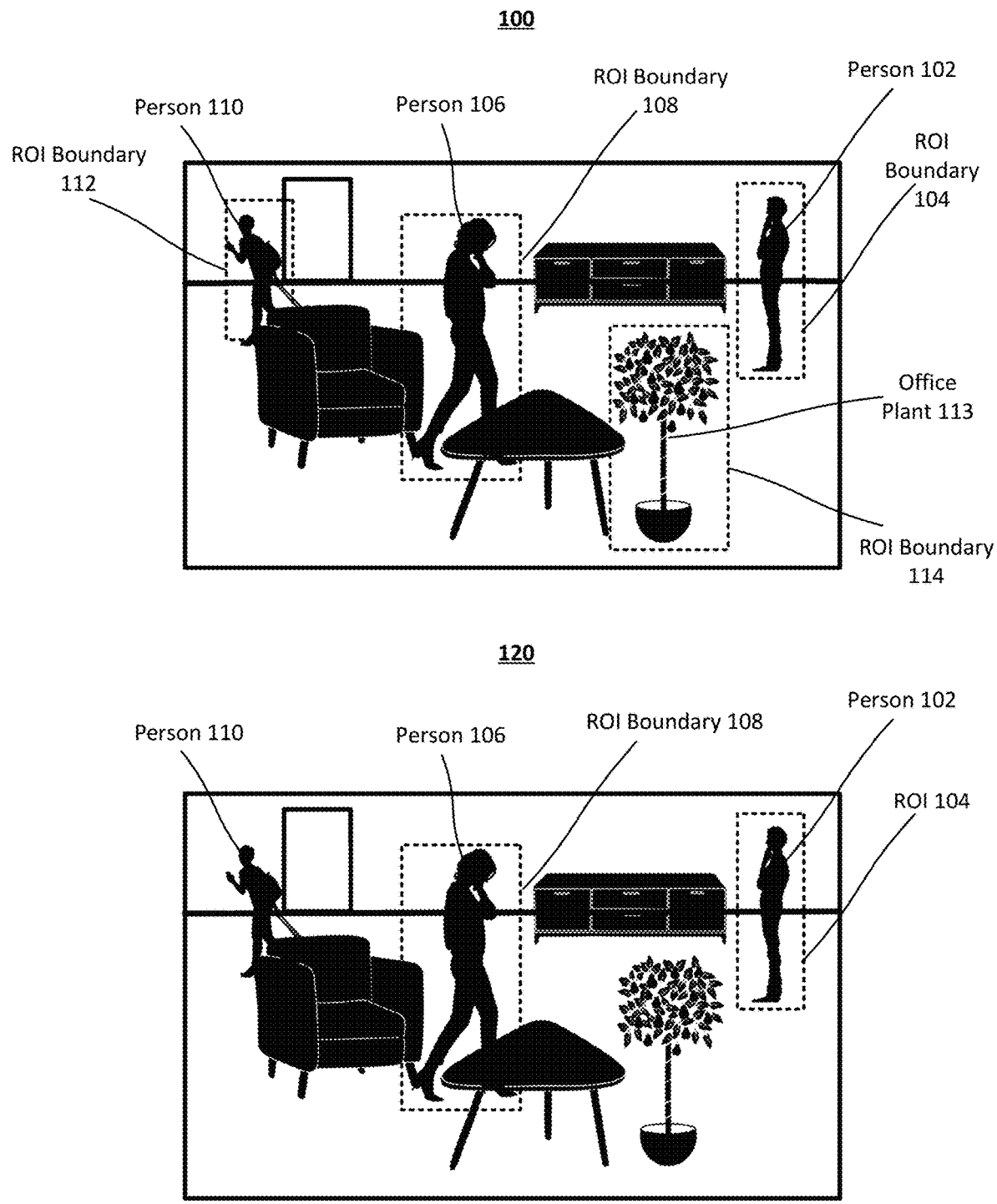
FIG. 1 depicts example images including ROI detection errors, in accordance with exemplary aspects of the present disclosure.

FIG. 1 depicts example images 100 and 120 that include ROI detection errors, in accordance with exemplary aspects of the present disclosure. Both images depict an office environment and may represent frames from a live camera feed captured by a security camera installed in the office environment. Suppose that an ROI detection model is configured to identify persons in an image. Both images include person 102, person 106, and person 110. In image 100, ROI boundary 104 encloses person 102, ROI boundary 108 encloses person 106, and ROI boundary 112 encloses person 110. Image 100 also features a false positive detection because an office plant 113 is bounded by ROI boundary 114. In contrast, image 120 features an ROI detection miss because person 110 is not bounded by an ROI boundary.

Figure 3:
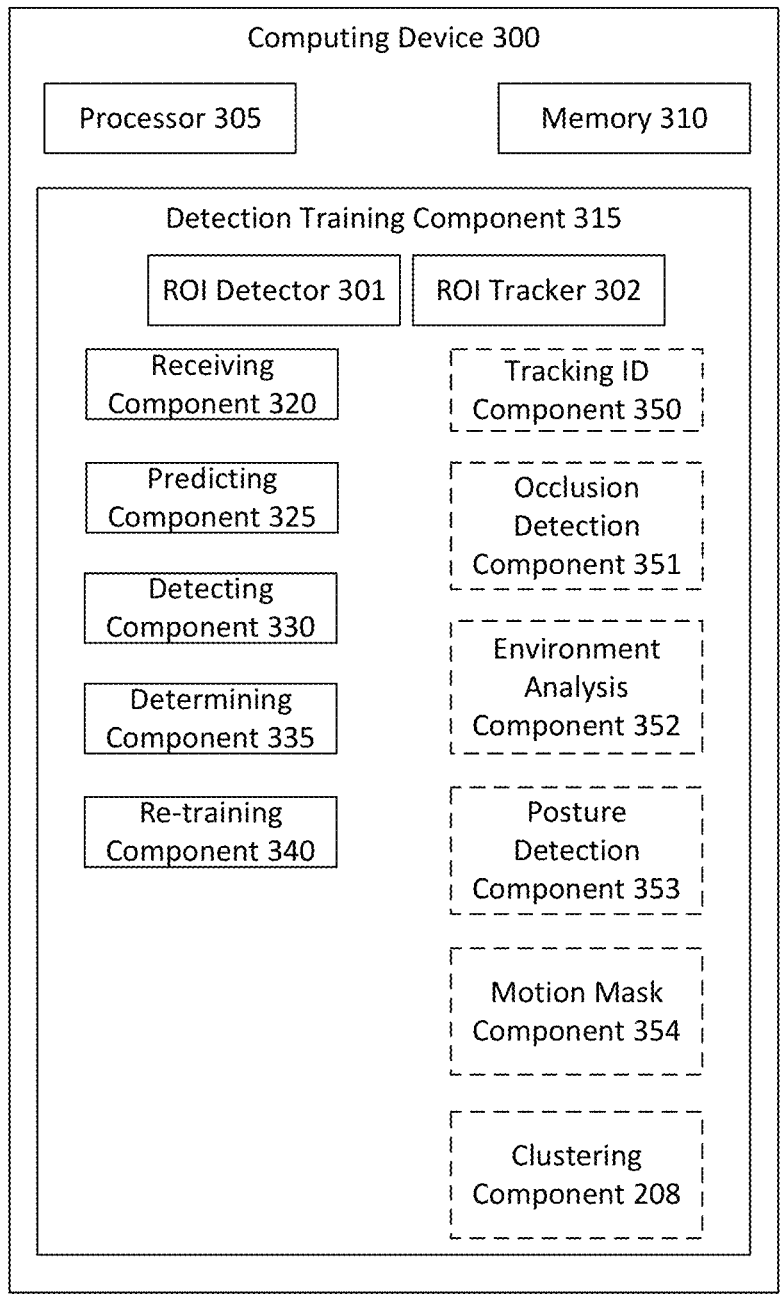
FIG. 3 is a block diagram of a computing device executing a detection training component, in accordance with exemplary aspects of the present disclosure.

In terms of identifying image frames in which an ROI detection was missed (e.g., image 120), multiple frames may be analyzed by a detection training component 315 (discussed in FIG. 3). The detection training component 315 may use tracking techniques to find detection misses. The ROI detector 301 (or the ROI detection model) is a machine learning model that requires improvement and the ROI tracker 302 is a computer vision/machine learning model that is used to improve the ROI detector 301. For example, ROI boundaries can be tracked by the ROI tracker 302 using techniques such as DeepSORT, Kalman filter, sliding window, centroid tracker or by the Hungarian algorithm. The ROI tracker 302 is a part of or in communication with the detection training component 315 that compares two similar images, in which a first image has marked ROI boundaries around an object. The ROI tracker 302 is configured to detect, based on the similarities between the first and second images, whether the object is present in the second image as well.

In a small time period (e.g., one second), a live camera feed may include several frames (e.g., 60 frames). Changes across these frames are often minimal. In fact, some frames may appear identical. The ROI detection model may generate ROI boundaries around various pre-defined objects. A frame received from the detection training component 315 may appear like images 100 and 120. Suppose that images 100 and 120 are consecutive frames. The detection training component 315 performs ROI tracking, in which the detection training component 315 predicts whether an ROI boundary should be in a second image (e.g., the subsequent frame) based on the ROI boundary determined by the ROI detection model in the first image. For example, if the ROI detection model detects person 110 in a first frame (e.g., image 100) and generates ROI boundary 112 around person 110, the detection training component 315 may identify that person 110 (which has a boundary around him/her in the first frame) appears in the subsequent frame (e.g., image 120) as well and thus should be bounded by ROI boundary 112 in the subsequent frame. The ROI detection model may then analyze image 120 and generate ROI boundaries around the persons present in image 120. The detection training component 315 evaluates whether the predicted (also referred to as tracked) ROI boundary 112 exists in image 120. In this example, the tracked ROI boundary 112 is not present in image 120, even though person 110 is present. If an ROI boundary is tracked successfully (i.e., person 110 is there, as predicted by the ROI tracker 302) but the ROI boundary is not detected (i.e., because the ROI detection model failed to identify the object and generate a corresponding ROI boundary), the frame is selected for training. For example, because ROI boundary 112 was not generated around person 110 in image 120 (even though it should be), the detection training component 315 would select image 120 for training.

In a video, an ROI boundary enclosing a specific object may appear across multiple frames (e.g., in 150 frames of a 5-second 30 FPS video) if the object remains in the video. For training purposes, detection training component 315 only selects a few frames from the several to prevent an increase in bias of the detection model (caused by using very similar to near identical training images). The amount of frames may be a pre-determined value (e.g., a percentage). For example, only 15-25 examples out of the 150 frames may be utilized. The detection training component 315 may assign a tracking ID to keep track of a count of ROI boundaries across multiple frames in order to be able to limit the number of frames per ROI boundary. A tracking ID may be a combination of characters that represent a given ROI boundary enclosing a specific object. Additionally, this tracking ID may be used to choose ROI boundaries at different distances (e.g., relative to the camera): near, far, medium. Bounding box sizes of tracked objects can help to choose the distance. A bigger bounding box is for a near ROI boundary, a small bounding box is for a far ROI boundary.

Suppose that a detection miss is identified and the frame is a candidate for training purposes. The detection training component 315 may determine a tracking ID of the missing ROI boundary and determine whether, for example, a threshold number of examples have already been selected for the given tracking ID. If the threshold number has not been reached, the frame may be saved as a training data image. If the threshold number has been reached, the frame may be skipped.

In some aspects, a quality index may be assigned to each frame (described further below) and detection training component 315 may remove a frame from the training dataset and add the new frame if the quality index of the new frame is higher than the quality index of the frame in the training dataset.

In some aspects, the detection training component 315 may identify detection misses using data acquired from sensors such as an audio sensor, a thermal camera, an RFID sensor or an occupancy sensor. For example with respect to an audio sensor, if an audio clue suggests that a person is present in an environment (e.g., a conversation in a voice clip captured by a security camera) despite an ROI boundary not existing in a frame captured at the same time, the detection training component 315 may determine that the frame should be selected for training. Likewise, in an example with respect to an occupancy sensor, if an occupancy schedule of a building or real-time occupancy data feed from an occupancy sensing (e.g., Lidar, Wi-Fi, Bluetooth, etc.) suggests that an untracked person is present in the environment at a given time (e.g., an employee is in his/her office) despite an ROI boundary not existing in one or more frames captured at the same time, the corresponding frames may be selected for training. Furthermore, in another example, thermal cameras can highlight body temperature, which can indicate that a person is in the environment even though the person is not detected in an image, and consequently corresponding frames may be selected for training. In yet another example, in crowd scenes, the number of head/face detections may be compared with number of ROI boundary detections to identify ROI detection misses (e.g., more heads than boundaries indicates detection misses, fewer heads than boundaries indicates false positives). In an additional example, if a crowd heat map or density estimation region is larger than a person detection region in a frame, the detection training component 315 may select the frame for inclusion in the training dataset.

In terms of false positive detections (e.g., the office plant in image 100), the detection training component 315 may use motion detection. Motion on a frame can be detected by methods such as frame subtraction, optical flow, or deep learning models. The detection training component 315 may create a motion mask and detection mask for an image, and may compare both mask regions. The detection mask may be a plurality of pixel values (organized as a 2D array) in which the portions of an image that are not bounded by an ROI boundary have pixel values set to "0." The motion mask is a differential array between two images. Areas with no movement will have pixel differentials of "0." Any pixel differentials that are non-zero are indicative of movement.

For a given region, if a ROI boundary (e.g., ROI boundary 114) is detected but no motion is found, the detection training component 315 may identify the ROI boundary as either a false positive or a static ROI (e.g., a person standing still). The detection training component 315 may determine whether the ROI boundary was tracked (e.g., if the ROI boundary was predicted to be in the location). If the ROI boundary was not tracked, the detection training component 315 identifies the ROI boundary as a false positive. It should be noted that in some frames, ROI boundaries are not detected, but motion is found. This may be due to an ROI detection miss or caused by trees, reflection, light change, fractals, etc. These frames are further reviewed by the detection training component for an ROI detection miss. In some aspects, the detection training component 315 ignores factors such as changes in backgrounds (e.g., lighting, reflections, etc.) using a combination of tracking methods and masks.

The following table depicts some examples of the verdict made by the detection training component 315 in terms of identifying detection misses and false positives.

TABLE 1

Frame Selection by ROI Detection & Tracking, and Motion Detection

| ROI Detector | ROI Tracker | Motion | Select Frame | Comment |
|---|---|---|---|---|
| False Positive | | | | |
| Yes | Yes/No | No | Yes | ROI is not moving or false detention |
| False Negative | | | | |

TABLE 1-continued

Frame Selection by ROI Detection & Tracking, and Motion Detection

| ROI Detector | ROI Tracker | Motion | Select Frame | Comment |
|---|---|---|---|---|
| No | Yes/No | Yes | Yes | ROI is not detected but something is moving |
| No | Yes | Yes/No Ignore | Yes | Detection Miss |
| Yes | Yes/No | Yes | No | Object is detected and motion is found |
| No | No | No | No | Nothing |

Data diversity may improve the performance of an ROI detection model and make the model adaptive to on-premise scenes. Accordingly, the detection training component 315 selects frames for training based on additional criteria to prevent a large number of duplicate or similar images from dominating a training dataset. The additional criteria may include selecting objects of interest at various distances (e.g., near, far, medium). For example, the detection training component 315 may pre-determine a list of objects that need more training examples (e.g., employees not wearing a uniform in the office) and are more difficult to identify if they are far away. Other examples of objects may be persons of a certain height, wearing a certain set of clothes, of a certain ethnicity, of a certain gender, etc. In some aspects, the additional criteria may select frames in which persons are standing in a certain posture (e.g., carrying a bag, speaking on the phone, walking, jogging, etc.). The detection training component 315 may utilize human pose estimation models such as OpenPose or DeepCut to identify a pose and evaluate whether the pose needs further training (e.g., more images may be needed for a person speaking on a phone).

The additional criteria used by the detection training component 315 to prevent duplicate/similar images may also include selecting frames with a certain level of illumination (e.g., morning, afternoon, evening, night, etc.) Alternatively or in addition, the additional criteria may include selecting frames captured during a specific season/weather. Balanced composition of training data captured at different times of the day—morning, afternoon, evening, night—and covering various seasons can eliminate any bias in detection accuracy on time of the day or season. If timestamps are not available with videos, the detection training component 315 may use image features to estimate seasons and timings. For example, the following attributes may be associated with the different times in a day: morning—low contrast, less brightness/illumination, afternoon—low contrast, high brightness/illumination, evening—high contrast (due to lights), very less brightness/illumination, raining/snowing—motion throughout images.

The additional criteria used by the detection training component 315 to prevent duplicate/similar images may include selecting frames with a certain background. For example, if a background features a ground-level window facing a parking lot, during the day, the window may show a variety of parked cars and during the night, the parking lot may be empty. In the latter case, the background is a lot simpler. The detection training component 315 may select a frame in which the background appears more busy than a frame where the background is simple.

The additional criteria used by the detection training component 315 to prevent duplicate/similar images may include selecting frames in which the ROI boundary encloses an occluded object. For example, in FIG. 1, the ROI tracker 302 may predict that an ROI boundary will be formed around person 110 in image 120. The predicted boundary will include person 110 and part of a chair that is blocking person 110. This is an example of an occluded object because the object is not fully visible and an obstacle is in between the line of sight of the camera capturing image 120 and person 110. Inclusion of enough occlusion data for training will improve model accuracy in real time scenes such as in retail shops, supermarket, coffee shop, restaurant and office, where ROI boundaries are occluded most of the time. The detection training component 315 may use the pixel plane to identify occluded ROI boundaries as their bounding boxes are smaller than normal, and then use feature plane analysis, which can suggest an absence of essential features from the occluded ROI boundaries. For example, in FIG. 1, feature plane of the occluded person 110 can confirm his/her missing legs.

The additional criteria may include selecting frames that are set outdoors or selecting frames that are set indoors depending on which type of data the ROI detection model has less accuracy with.

The additional criteria may include selecting frames taken from different overhead camera heights, placements, and camera settings (e.g., adjusted zoom, contrast, field of view (FOV), etc.)

Figure 2:
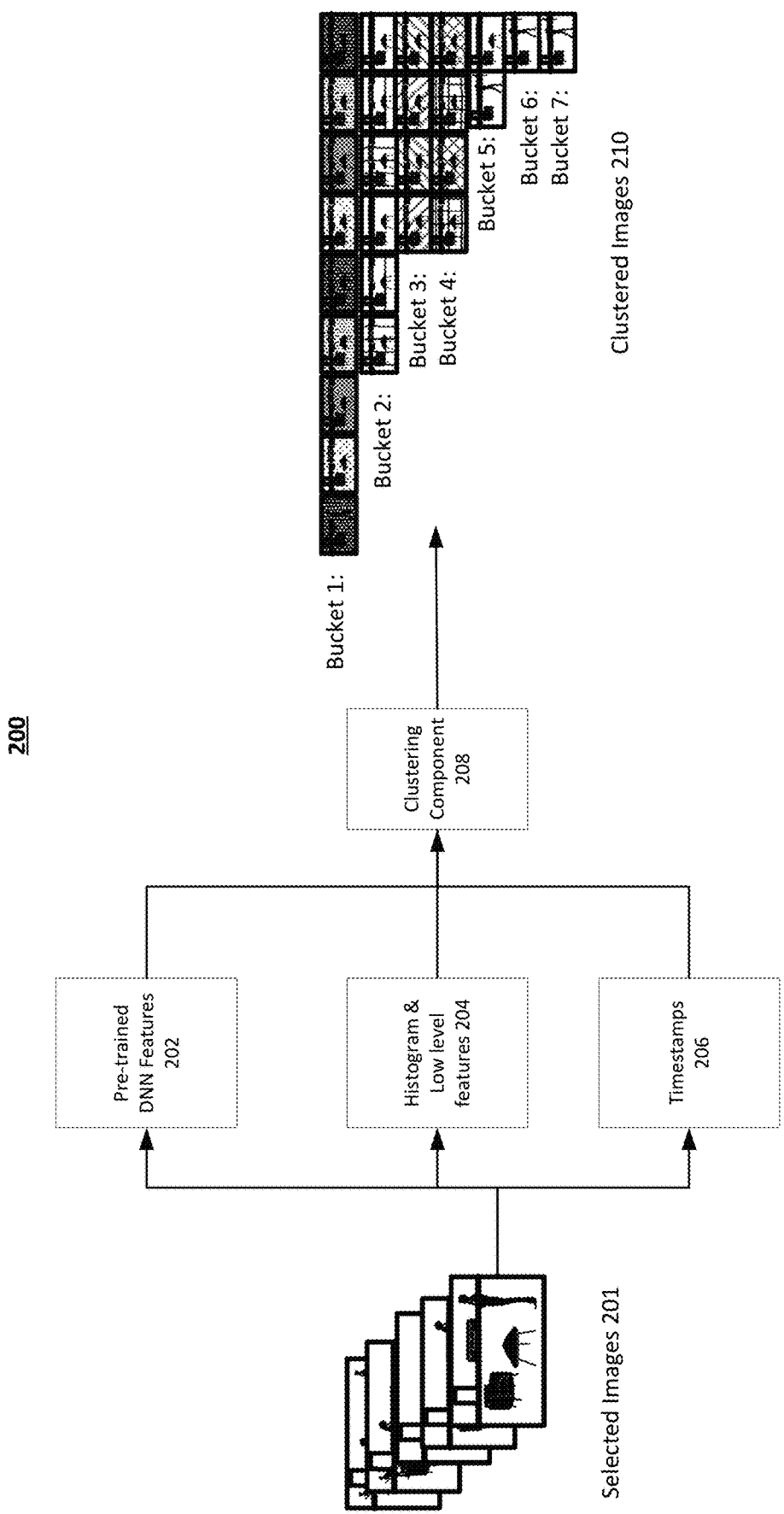
FIG. 2 is a block diagram of a clustering approach to select training images, in accordance with exemplary aspects of the present disclosure.

FIG. 2 is block diagram 200 of a clustering approach to select training images, in accordance with exemplary aspects of the present disclosure. In some aspects, the images selected by the detection training component (e.g., selected images 201) may be clustered into different buckets (e.g., buckets 1-7 in FIG. 2), wherein each bucket contains similar images. Each bucket may also represent a certain type of additional criteria mentioned above. For example, bucket 1 may include low-light images taken during the night and bucket 2 may include daylight images. Bucket 3 may include images with larger crowds. Bucket 4 may include images with no objects of interest. Bucket 5 may include images where persons are in a certain pose. Bucket 6 may include images where persons are occluded. Bucket 7 may include images where persons are holding items.

In one example, the detection training component 315 may extract pre-trained Deep Neural Network (DNN) generated image features 202, an image histogram (to capture color information), and low level features 204 such as lines and edges. These extractions are input as features for a clustering component 208 that executes DBscan or Hierarchical clustering. In some aspects, frame timestamps 206 are used as an additional feature such that images that have closer timestamps, similar ROI boundaries (e.g., size and location in an image) and background features are grouped together. The required number of images, which may be pre-determined, can be aggregated by the detection training component from each bucket for training the ROI detection model (e.g., 6 images from bucket 1, 3 images from bucket 2, etc.). By this way, a variety of data is collected including varying background, colors, lines, etc.

In some aspects, the detection training component 315 may automatically annotate training data using ROI detection and ROI tracking along with sensor data fusion as described previously. An additional annotation approach is discussed below.

Manual ROI annotation is time and resource consuming and any machine annotation followed by human correction requires significant effort to correct bounding boxes (e.g., drawing new bounding boxes on detection miss and removing bounding boxes on false detections). In one example, the detection training component 315 may utilize one or more automatic ROI detection models, such as subjecting its training data to two ROI detection models such as YoloV5x6 and EfficientDet-D7x. If ROI detections are matching and consistent (more overlapping) for an image, these ROI detections are stored as its annotation. In this manner, significant portions of images (e.g., 80-90 percent) may be annotated. For any non-matching case, a normalized matching score (0, 1) is given to the image as a function of a total number of non-matching detections and a total number of inconsistent detections. A higher score is assigned for closely-matching detections, while a lower score is assigned for distant-matching detections.

The detection training component 315 may sort non-annotated data in increasing order of their matching score. Thus the method includes retrieving a portion of sorted data for manual annotation (e.g., 10 percent of the total data), training the ROI detection models with the manual annotations, annotating the remaining non-annotated data, and repeating these steps until all of the data is annotated. In some aspects, the detection training component 315 may annotate the complete data with lesser human involvement/manual annotation (e.g., 1-3% of total data).

In some aspects, the detection training component 315 may associate a quality index to each image to control quality of the overall training data. The detection training component 315 may perform model training at varying degrees of training data quality if necessary. Based on the required data quantity, the detection training component 315 may choose the best quality data for training. In one example, construction of quality index for each data is given as:

$$QI(f) = \sum_{k=0}^{n} w_k \times C_k$$

where the Quality Index (QI) of each data frame (f) is a weighted ($w_k$) sum of confidence score ($C_k$) of 'n' individual data analytics. Here, the weight ($w_k$) is a pre-determined value. The confidence score may include one or a combination of ROI detection score, ROI tracking score, motion magnitude, cluster confidence score, occlusion percent score, etc.

Figure 4:
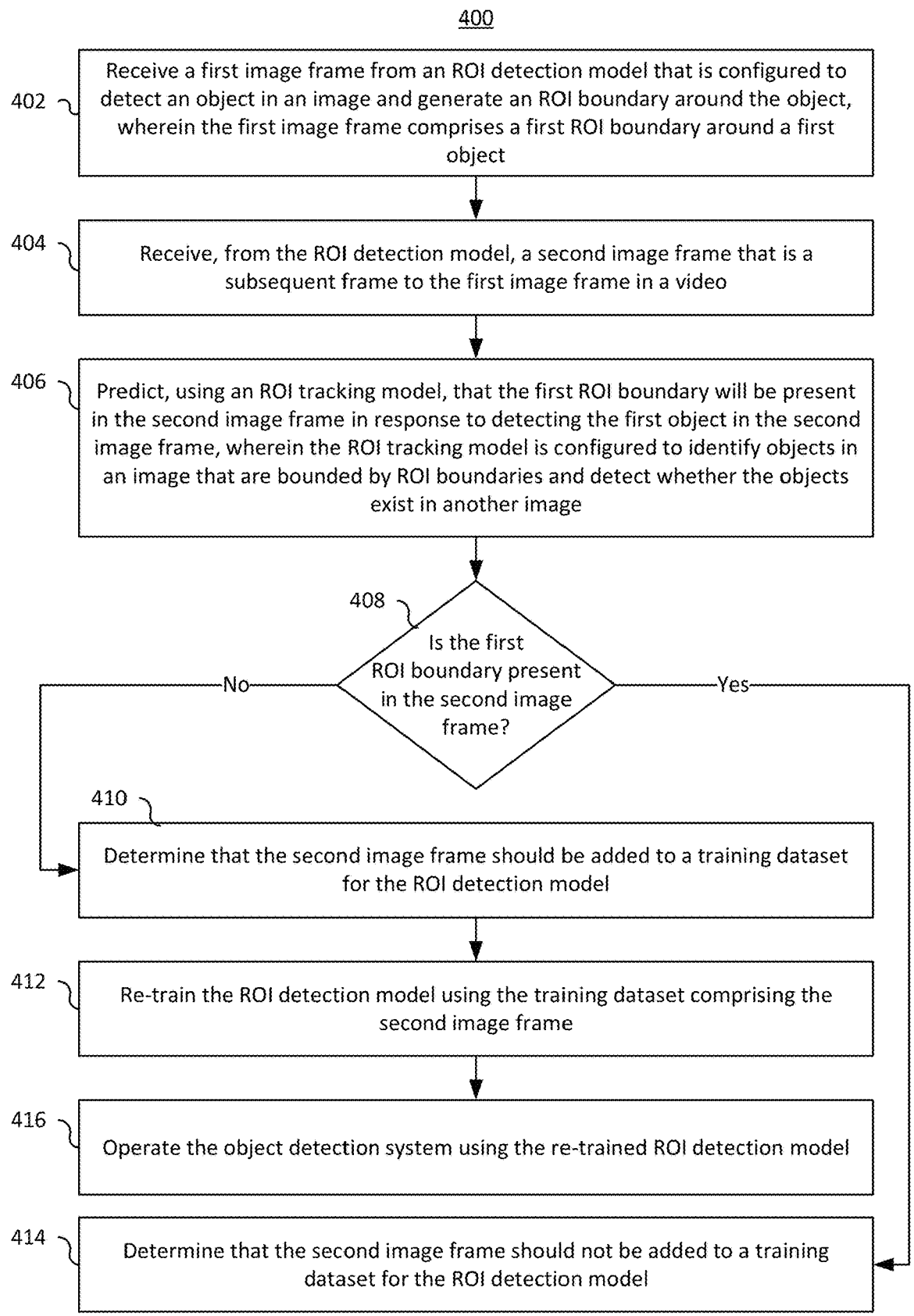
FIG. 4 is a flowchart illustrating a method of re-training a region of interest (ROI) detection model to fix detection misses, in accordance with exemplary aspects of the present disclosure.

FIG. 3 is a block diagram of computing device 300 executing detection training component 315, in accordance with exemplary aspects of the present disclosure. FIG. 4 is a flowchart illustrating method 400 of re-training a region of interest (ROI) detection model to fix detection misses, in accordance with exemplary aspects of the present disclosure. Referring to FIG. 3 and FIG. 4, in operation, computing device 300 may perform method 400 of re-training a region of interest (ROI) detection model to fix detection misses via execution of detection training component 315 by processor 305 and/or memory 310.

At block 402, the method 400 includes receiving a first image frame from an ROI detection model that is configured to detect an object in an image and generate an ROI boundary around the object, wherein the first image frame comprises a first ROI boundary around a first object. For example, in an aspect, computer device 300, processor 305, memory 310, detection training component 315, and/or receiving component 320 may be configured to or may comprise means for receiving image 100 from an ROI detection model that is configured to detect persons in an image and generate an ROI boundary around the object. The first image frame may include ROI boundary 112 around person 110.

At block 404, the method 400 includes receiving, from the ROI detection model, a second image frame that is a subsequent frame to the first image frame in a video. For example, in an aspect, computer device 300, processor 305, memory 310, detection training component 315, and/or receiving component 320 may be configured to or may comprise means for receiving, from the ROI detection model, image 120 that is a subsequent frame to image 100 in a security surveillance stream.

At block 406, the method 400 includes predicting, using an ROI tracking model, that the first ROI boundary will be present in the second image frame in response to detecting the first object in the second image frame, wherein the ROI tracking model is configured to identify objects in an image that are bounded by ROI boundaries and detect whether the objects exist in another image. For example, in an aspect, computer device 300, processor 305, memory 310, detection training component 315, and/or predicting component 325 may be configured to or may comprise means for predicting, using an ROI tracking model, that ROI boundary 112 will be present in image 120 in response to detecting person 110 in image 120.

The ROI tracking model may be configured to identify persons in an image that are bounded by ROI boundaries and detect whether the objects exist in another image. For example, the ROI tracking model may detect persons 110, person 106, and person 102 in image 100 because they are each surrounded by an ROI boundary. The ROI tracking model may then search for those persons in image 120. If the person is detected, it can be assumed that an ROI boundary should also be enclosing the detected person. In image 120, however, the detection model misses person 110.

At block 408, the method 400 includes detecting whether the first ROI boundary is present in the second image frame. For example, in an aspect, computer device 300, processor 305, memory 310, detection training component 315, and/or detecting component 330 may be configured to or may comprise means for detecting whether ROI boundary 112 is present in image 120. For example, detecting component 330 may search for a set of pixels resembling a boundary (e.g., of any shape) that is found in image 100 around person 110 in image 120.

If detecting component 330 determines that the first ROI boundary is not present, method 400 advances to block 410. If the first ROI boundary is detected in the second image frame, method 400 advances 414.

At block 410, the method 400 includes determining that the second image frame should be added to a training dataset for the ROI detection model. For example, in an aspect, computer device 300, processor 305, memory 310, detection training component 315, and/or determining component 335 may be configured to or may comprise means for determining that image 120 should be added to a training dataset for the ROI detection model. In some aspects, an ROI boundary is added to image 120 around person 110 where person 110 is located. This updated image is then added to the training dataset.

At block 412, the method 400 includes re-training the ROI detection model using the training dataset comprising the second image frame. For example, in an aspect, computer device 300, processor 305, memory 310, detection training component 315, and/or re-training component 340 may be configured to or may comprise means for re-training the ROI detection model using the training dataset comprising image 120. For example, re-training component 340 may execute a training algorithm to update the weights in the ROI detection model that are used to classify objects. This training algorithm may use techniques such as gradient descent. Because the images in the training dataset include examples of objects that the ROI detection model failed to detect previously, the updated weights will enable the ROI detection model to learn how to detect the missed objects. Accordingly, for example, the re-trained ROI detection model will generate the first ROI boundary (e.g., ROI boundary 112) around the first object (e.g., person 110) in any subsequently inputted image frame depicting the first object.

At block 416, the method 400 includes operating the object detection system using the re-trained ROI detection model, wherein the re-trained ROI detection model generates the first ROI boundary around the first object in any subsequently inputted image frame depicting the first object. For example, in an aspect, computer device 300, processor 305, memory 310, detection training component 315, and/or re-training component 340 may be configured to operate the object detection system using the re-trained ROI detection model, wherein the re-trained ROI detection model generates the first ROI boundary around the first object in any subsequently inputted image frame depicting the first object. In some aspects, the re-trained ROI detection model being operated does not generate the second ROI boundary around the second object in any subsequently inputted image frame depicting the second object (discussed in FIG. 5).

At block 414, the method 400 includes determining that the second image frame should not be added to a training dataset for the ROI detection model. For example, in an aspect, computer device 300, processor 305, memory 310, detection training component 315, and/or determining component 335 may be configured to or may comprise means for determining that image 120 should not be added to a training dataset for the ROI detection model. In this case, image 120 is skipped and the next frame is considered. If the next frame is identified as an image that should be added to the training dataset, re-training component 340 may re-training the ROI detection model using the training dataset comprising the next frame.

Figure 5:
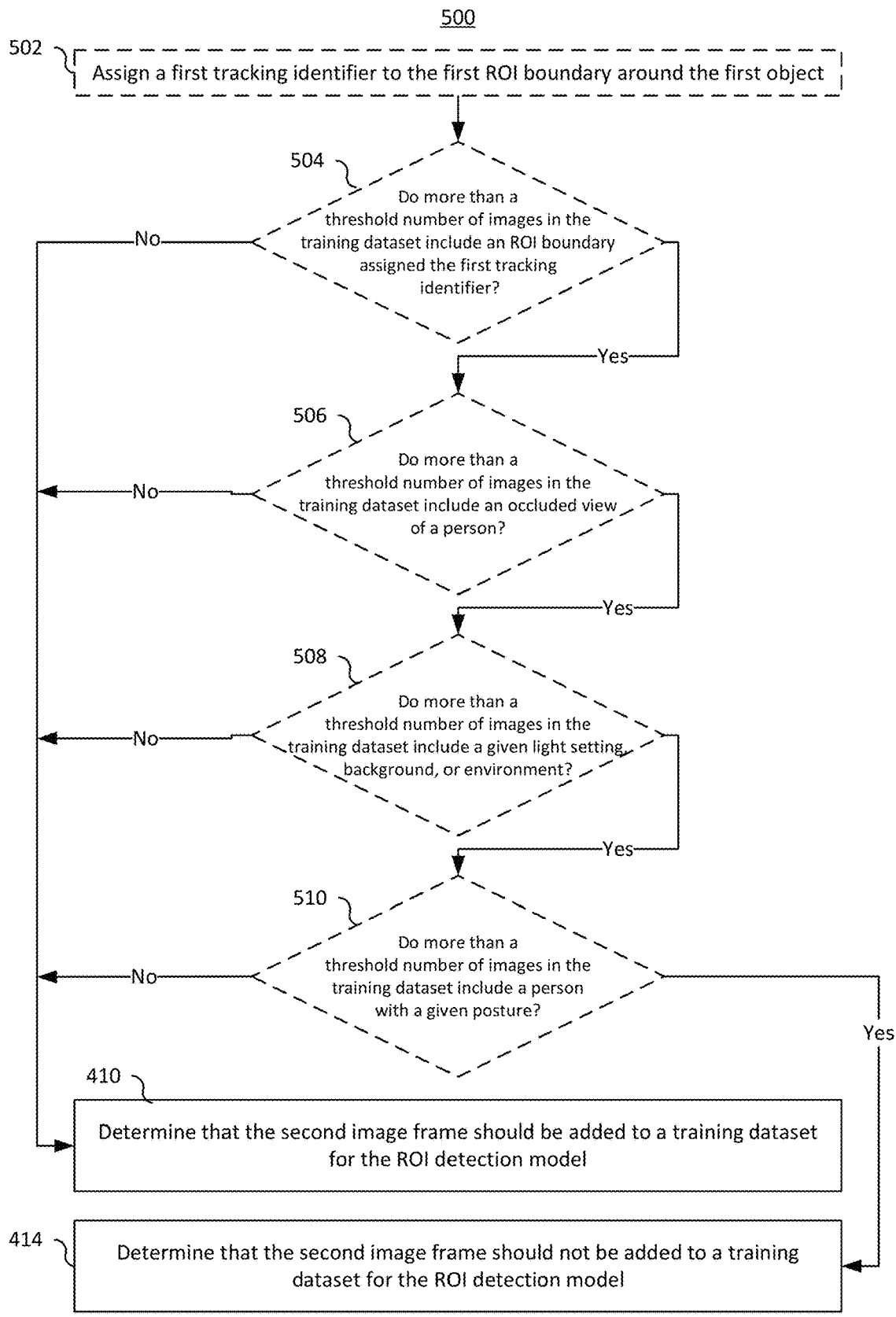
FIG. 5 is a flowchart illustrating a method of selecting frames for a training dataset, in accordance with exemplary aspects of the present disclosure.

FIG. 5 is a flowchart illustrating method 500 of selecting frames for a training dataset, in accordance with exemplary aspects of the present disclosure. Method 500 may be executed by detection training component 315 when, at block 408, detecting component 330 determines that the first ROI boundary is not present in the second image frame. Prior to determining that the second image frame should be added to the training set, method 500 may be initiated at either block 502, block 506, block 508, or block 510.

At block 502, the method 500 includes assigning a first tracking identifier to the first ROI boundary around the first object. For example, in an aspect, computer device 300, processor 305, memory 310, detection training component 315, and/or tracking ID component 350 may be configured to or may comprise means for assigning a first tracking identifier (e.g., a set of characters such as "ABC123") to ROI boundary 108 around person 106.

At block 504, the method 500 includes determining whether more than a threshold number of images in the training dataset include an ROI boundary assigned with the first tracking identifier. For example, in an aspect, computer device 300, processor 305, memory 310, detection training component 315, and/or tracking ID component 350 may be configured to or may comprise means for determining whether more than a threshold number of images in the training dataset include ROI boundary 108 assigned with the first tracking identifier. Tracking ID component 350 may search for all instances of images in the training dataset that include the tracking ID "ABC123." For example, if there are 40 images associated with ROI boundary 108 (i.e., they have tracking ID "ABC123") because the ROI detection model consistently missed person 106 and the threshold number of images is 40, tracking ID component 350 may not add more examples of the ROI boundary because adding more examples may generate a bias in the ROI detection model.

If tracking ID component 350 determines that less than a threshold number of images are in the training dataset that include an ROI boundary assigned the first tracking identifier, method 500 advances to block 410 of method 400. Otherwise, method 500 may advance either to block 414 of method 400 or block 506 of method 500 (depending on user settings).

At block 506, the method 500 includes determining whether more than a threshold number of images in the training dataset include an occluded view of a person. For example, in an aspect, computer device 300, processor 305, memory 310, detection training component 315, and/or occlusion detection component 351 may be configured to or may comprise means for determining whether more than a threshold number of images in the training dataset include an occluded view of a person. In image 120, person 110 may not have been detected due to person 110 being blocked by a sofa. If only a few examples of occluded views are present in the training dataset (e.g., less than the threshold number), detection training component 315 will add more examples to diversify the training dataset. Occlusion detection component 351 may utilize computer vision techniques to determine whether a full view of the object is found within the ROI boundary. In this example, the legs of person 110 are missing. Accordingly, occlusion detection component 351 adds a tag to image 120 indicating that person 110 is occluded.

If occlusion detection component 351 determines that less than a threshold number of images are in the training dataset that include an occluded view of a person, method 500 advances to block 410 of method 400. Otherwise, method 500 may advance either to block 414 of method 400 or block 508 of method 500 (depending on user settings).

At block 508, the method 500 includes determining whether more than a threshold number of images in the training dataset include a given light setting, background, or environment. For example, in an aspect, computer device 300, processor 305, memory 310, detection training component 315, and/or environment analysis component 352 may be configured to or may comprise means for determining whether more than a threshold number of images in the training dataset include a given light setting, background, or environment. Environment analysis component 352 may use computer vision and machine learning techniques to classify different types of lighting and environments. Based on the classifications (e.g., "night," "low-light," "busy background," etc.), environment analysis component 352 may add a tag to each image that is identified as a potential training image. Detection training component 315 may query these tags to determine how many images in the training dataset have a specific tag.

If environment analysis component 352 determines that less than a threshold number of images are in the training dataset that include a given light setting, background, or environment, method 500 advances to block 410 of method 400. Otherwise, method 500 may advance either to block 414 of method 400 or block 510 of method 500 (depending on user settings).

At block 510, the method 500 includes determining whether more than a threshold number of images in the training dataset include a person with a given posture. For example, in an aspect, computer device 300, processor 305, memory 310, detection training component 315, and/or posture detection component 353 may be configured to or may comprise means for determining whether more than a threshold number of images in the training dataset include a person with a given posture.

If environment analysis component 352 determines that less than a threshold number of images are in the training dataset that include a person with a given posture, method 500 advances to block 410 of method 400. Otherwise, method 500 may advance to block 414 of method 400.

Figure 6:
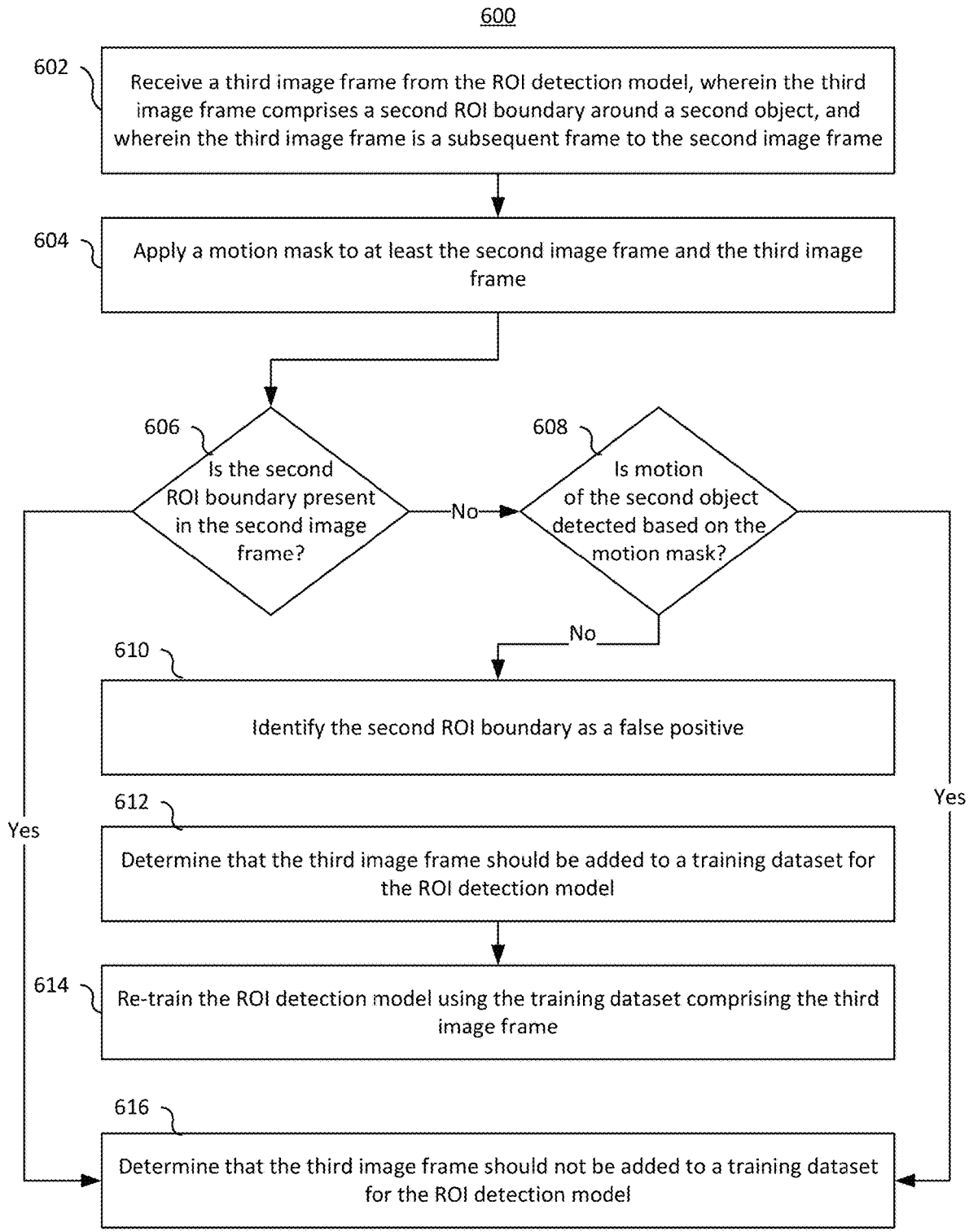
FIG. 6 is a flowchart illustrating a method of re-training a region of interest (ROI) detection model to fix false positive detection, in accordance with exemplary aspects of the present disclosure.

FIG. 6 is a flowchart illustrating method 600 of re-training a region of interest (ROI) detection model to fix false positive detection, in accordance with exemplary aspects of the present disclosure. The examples provided for FIG. 6 are made in reference to FIG. 1, with certain modifications. Specifically, suppose that image 100 is the third image frame and image 120 is the second image frame.

At block 602, the method 600 includes receiving a third image frame from the ROI detection model, wherein the third image frame comprises a second ROI boundary around a second object, and wherein the third image frame is a subsequent frame to the second image frame. For example, in an aspect, computer device 300, processor 305, memory 310, detection training component 315, and/or receiving component 320 may be configured to or may comprise means for receiving image 100 from the ROI detection model, wherein image 100 comprises ROI boundary 114 around an office plant, and wherein image 100 is a subsequent frame to image 120.

At block 604, the method 600 includes applying a motion mask to at least the second image frame and the third image frame. For example, in an aspect, computer device 300, processor 305, memory 310, detection training component 315, and/or motion mask component 354 may be configured to or may comprise means for applying a motion mask to at least image 100 and image 120. The motion mask is a difference in the pixel values between the images.

At block 606, the method 600 includes detecting whether the second ROI boundary is present in the second image frame. For example, in an aspect, computer device 300, processor 305, memory 310, detection training component 315, and/or detecting component 330 may be configured to or may comprise means for detecting whether ROI boundary 114 is present in image 120.

If the second ROI boundary is not present, method 600 advances to block 616. Otherwise, method 600 advances to block 608.

At block 608, the method 600 includes determining whether motion of the second object is detected based on the motion mask. For example, in an aspect, computer device 300, processor 305, memory 310, detection training component 315, and/or motion mask component 354 may be configured to or may comprise means for determining whether motion of the second object is detected based on the motion mask. For pixels associated with fixed objects such as the sofas, tables, etc., the motion mask will show a differential of "0" because the pixel values cancel each other out. Motion mask component 354 may query, based on whether the differential is "0," if the portions within an ROI boundary include motion. Because in the case of ROI boundary 114, the differential is "0" between images 100 and 120, no motion is detected.

In response to determining that motion is not detected, method 600 advances to block 610. Otherwise, method 600 advances to block 616.

At block 610, the method 600 includes identifying the second ROI boundary as a false positive. For example, in an aspect, computer device 300, processor 305, memory 310, detection training component 315, and/or determining component 335 may be configured to or may comprise means for identifying ROI boundary 114 as a false positive.

At block 612, the method 600 includes determining that the third image frame should be added to a training dataset for the ROI detection model. For example, in an aspect, computer device 300, processor 305, memory 310, detection training component 315, and/or determining component 335 may be configured to or may comprise means for determining that image 100 should be added to a training dataset for the ROI detection model. In some aspects, ROI boundary 114 may be removed by detection training component 315 to generate a corrected image. This corrected image is what is added to the training dataset.

At block 614, the method 600 includes re-training the ROI detection model using the training dataset comprising the third image frame. Accordingly, the re-trained ROI detection model will not generate the second ROI boundary around the second object in any subsequently inputted image frame depicting the second object. For example, in an aspect, computer device 300, processor 305, memory 310, detection training component 315, and/or re-training component 614 may be configured to or may comprise means for re-training the ROI detection model using the training dataset comprising image 100 (or a corrected version of image 100).

At block 616, the method 600 includes determining that the third image frame should not be added to a training dataset for the ROI detection model. For example, in an aspect, computer device 300, processor 305, memory 310, detection training component 315, and/or determining component 335 may be configured to or may comprise means for determining that image 100 should not be added to a training dataset for the ROI detection model.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for object detection, comprising:
at least one memory comprising instructions;
at least one hardware processor coupled with the at least one memory and configured individually or in combination to execute the instructions, to:
   detect a first object in a second image frame, wherein the first object is bounded by a first region-of-interest (ROI) boundary generated in a first image frame by an ROI detection model, and wherein the first image frame precedes the second image frame in a video;
   determine that the second image frame should be added to a training dataset for the ROI detection model in response to detecting that the ROI detection model did not generate the first ROI boundary in the second image frame; and re-train the ROI detection model, to define a re-trained ROI detection model, using the training dataset comprising the second image frame in response to determining that the second image frame should be added to the training dataset.

2. The apparatus of claim 1, wherein the at least one hardware processor is configured to execute the instructions to:

execute the re-trained ROI detection model, wherein the re-trained ROI detection model generates the first ROI boundary around the first object in any subsequently inputted image frame depicting the first object.

3. The apparatus of claim 1, wherein the at least one hardware processor is configured to execute the instructions to:

determine that the second image frame should not be added to the training dataset for the ROI detection model in response to detecting that the ROI detection model did generate the first ROI boundary in the second image frame; and re-train the ROI detection model, to define the re-trained ROI detection model, using the training dataset not comprising the second image frame in response to determining that the second image frame should not be added to the training dataset.

4. The apparatus of claim 1, wherein the at least one hardware processor is configured to execute the instructions to determine that the second image frame should be added to the training dataset by:

assigning a first tracking identifier to the first ROI boundary around the first object;

determining whether more than a threshold number of images in the training dataset include an ROI boundary assigned the first tracking identifier; and adding the second image frame to the training dataset in response to determining that less than the threshold number of images in the training dataset include the ROI boundary assigned the first tracking identifier.

5. The apparatus of claim 1, wherein the first object is a person and the first ROI boundary has an occluded view of the person, and wherein the at least one hardware processor is configured to execute the instructions to determine that the second image frame should be added to the training dataset by:

determining whether more than a threshold number of images in the training dataset include the occluded view of the person; and adding the second image frame to the training dataset in response to determining that less than the threshold number of images in the training dataset include the occluded view of the person.

6. The apparatus of claim 1, wherein the second image frame depicts a scene with a given light setting, background, or environment, and wherein the at least one hardware processor is configured to execute the instructions to determine that the second image frame should be added to the training dataset by:

determining whether more than a threshold number of images in the training dataset include the given light setting, background, or environment; and adding the second image frame to the training dataset in response to determining that less than the threshold number of images in the training dataset include the given light setting, background, or environment.

7. The apparatus of claim 1, wherein the at least one hardware processor is configured to execute the instructions to:

receive a third image frame from the ROI detection model, wherein the third image frame comprises a second ROI boundary around a second object, and wherein the third image frame is a subsequent frame to the second image frame;

apply a motion mask to at least the second image frame and the third image frame;

detect whether the second ROI boundary is present in the second image frame;

in response to determining that the second ROI boundary is not present in the second image frame and detecting no motion of the second object based on the motion mask, identify the second ROI boundary as a false positive;

determine that the third image frame should be added to the training dataset; and re-train the ROI detection model using the training dataset comprising the third image frame.

8. The apparatus of claim 7, wherein the at least one hardware processor is configured to execute the instructions to:

execute the re-trained ROI detection model, wherein the re-trained ROI detection model does not generate the second ROI boundary around the second object in any subsequently inputted image frame depicting the second object.

9. A method for object detection, comprising:

detecting a first object in a second image frame, wherein the first object is bounded by a first region-of-interest (ROI) boundary generated in a first image frame by an ROI detection model, and wherein the first image frame precedes the second image frame in a video;

determining that the second image frame should be added to a training dataset for the ROI detection model in response to detecting that the ROI detection model did not generate the first ROI boundary in the second image frame; and re-training the ROI detection model, to define a re-trained ROI detection model, using the training dataset comprising the second image frame in response to determining that the second image frame should be added to the training dataset.

10. The method of claim 9, further comprising:

executing the re-trained ROI detection model, wherein the re-trained ROI detection model generates the first ROI boundary around the first object in any subsequently inputted image frame depicting the first object.

11. The method of claim 9, further comprising:

determining that the second image frame should not be added to the training dataset for the ROI detection model in response to detecting that the ROI detection model did generate the first ROI boundary in the second image frame; and re-training the ROI detection model, to define the re-trained ROI detection model, using the training dataset not comprising the second image frame in response to determining that the second image frame should not be added to the training dataset.

12. The method of claim 9, wherein determining that the second image frame should be added to the training dataset comprises:

assigning a first tracking identifier to the first ROI boundary around the first object;

determining whether more than a threshold number of images in the training dataset include an ROI boundary assigned the first tracking identifier; and adding the second image frame to the training dataset in response to determining that less than the threshold number of images in the training dataset include the ROI boundary assigned the first tracking identifier.

13. The method of claim 9, wherein the first object is a person and the first ROI boundary has an occluded view of the person, and wherein determining that the second image frame should be added to the training dataset comprises:

determining whether more than a threshold number of images in the training dataset include the occluded view of the person; and adding the second image frame to the training dataset in response to determining that less than the threshold number of images in the training dataset include the occluded view of the person.

14. The method of claim 9, wherein the second image frame depicts a scene with a given light setting, background, or environment, and wherein determining that the second image frame should be added to the training dataset comprises:

determining whether more than a threshold number of images in the training dataset include the given light setting, background, or environment; and adding the second image frame to the training dataset in response to determining that less than the threshold number of images in the training dataset include the given light setting, background, or environment.

15. The method of claim 9, further comprising:

receiving a third image frame from the ROI detection model, wherein the third image frame comprises a second ROI boundary around a second object, and wherein the third image frame is a subsequent frame to the second image frame;

applying a motion mask to at least the second image frame and the third image frame;

detecting whether the second ROI boundary is present in the second image frame;

in response to determining that the second ROI boundary is not present in the second image frame and detecting no motion of the second object based on the motion mask, identifying the second ROI boundary as a false positive;

determining that the third image frame should be added to the training dataset; and re-training the ROI detection model using the training dataset comprising the third image frame.

16. The method of claim 15, further comprising:

executing the re-trained ROI detection model, wherein the re-trained ROI detection model does not generate the second ROI boundary around the second object in any subsequently inputted image frame depicting the second object.

17. A non-transitory computer readable medium storing thereon computer executable instructions for object detection, including instructions for:

detecting a first object in a second image frame, wherein the first object is bounded by a first region-of-interest (ROI) boundary generated in a first image frame by an ROI detection model, and wherein the first image frame precedes the second image frame in a video;

determining that the second image frame should be added to a training dataset for the ROI detection model in response to detecting that the ROI detection model did not generate the first ROI boundary in the second image frame; and re-training the ROI detection model, to define a re-trained ROI detection model, using the training dataset comprising the second image frame in response to determining that the second image frame should be added to the training dataset.

18. The non-transitory computer readable medium of claim 17, further comprising instructions for:

executing the re-trained ROI detection model, wherein the re-trained ROI detection model generates the first ROI boundary around the first object in any subsequently inputted image frame depicting the first object.

19. The non-transitory computer readable medium of claim 17, further comprising instructions for:

determining that the second image frame should not be added to the training dataset for the ROI detection model in response to detecting that the ROI detection model did generate the first ROI boundary in the second image frame; and re-training the ROI detection model, to define the re-trained ROI detection model, using the training dataset not comprising the second image frame in response to determining that the second image frame should not be added to the training dataset.

20. The non-transitory computer readable medium of claim 17, wherein an instruction for determining that the second image frame should be added to the training dataset comprises instructions for:

assigning a first tracking identifier to the first ROI boundary around the first object;

determining whether more than a threshold number of images in the training dataset include an ROI boundary assigned the first tracking identifier; and adding the second image frame to the training dataset in response to determining that less than the threshold number of images in the training dataset include the ROI boundary assigned the first tracking identifier.

* * * * *

UNITED STATES PATENT AND TRADEMARK OFFICE
CERTIFICATE OF CORRECTION

| | | |
|---|---|---|
| PATENT NO. | : 12,147,501 B2 | Page 1 of 1 |
| APPLICATION NO. | : 18/533921 | |
| DATED | : November 19, 2024 | |
| INVENTOR(S) | : Santle Camilus Kulandai Samy et al. | |

It is certified that error appears in the above-identified patent and that said Letters Patent is hereby corrected as shown below:

On the Title Page

Item (72) Inventors:

Please correct the third Inventor's first name read as follows:
"Yohai" to -- Yohay --; and The fifth Inventor's city and country as follows:
"Bangalore, (IL) to -- Bhilai Nagar, Chhattisgarh (IN) --.

Signed and Sealed this
Twelfth Day of August, 2025

Coke Morgan Stewart
*Acting Director of the United States Patent and Trademark Office*